United States Patent [19]
Popravsky

[11] Patent Number: 5,196,274
[45] Date of Patent: Mar. 23, 1993

[54] ELECTROCHEMICAL ENERGY DEVICE

[76] Inventor: Wallace N. Popravsky, 30106 White Hall Ct., Farmington Hills, Mich. 48331

[21] Appl. No.: 550,110

[22] Filed: Jul. 9, 1990

[51] Int. Cl.$^5$ ............................................. H01M 8/00
[52] U.S. Cl. ........................................ 429/13; 429/30; 429/33; 429/129; 429/218; 420/528
[58] Field of Search .................... 429/15, 40, 218, 13, 429/30, 33, 129; 420/528

[56] References Cited
U.S. PATENT DOCUMENTS
3,887,399 6/1975 Seiger ................................. 429/15

Primary Examiner—R. Bruce Breneman
Attorney, Agent, or Firm—Brooks & Kushman

[57] ABSTRACT

Described is a device for the electrochemical generation of direct current comprising an electrode comprised of aluminum mercury mixture, an electrode comprised of an oxidant, and an electronic conductor separator therebetween. A most preferred embodiment is an electrode comprised of aluminum mercury amalgam, a oxidant electrode comprised of a permanganate and the separator between the two electrodes would be a germanium aluminum doped wafer.

10 Claims, 1 Drawing Sheet

ELECTROCHEMICAL ENERGY DEVICE

BACKGROUND ART

I. Field of the Invention

The invention pertains to electrochemical energy device. The device is specifically concerned with the electrochemical energy developed from oxidizing aluminum in the electrochemical generation of current.

II. Description of the Prior Art

U.S. Pat. No. 3,644,150 issued to Oomen et al discloses a primary cell in which potassium persulfate is used as a depolarizer and a stabilizer. According to Oomen, a preferred embodiment of the primary cell provides for a zinc anode in which the separator consists of a cation-exchanging diaphragm and the cathode (depolarizer mass) consists of a compressed mass mainly comprising pulverulent carbon., such as graphite or carbon felt. The cathode further includes a depolarizer and a stabilizer for use with a collector such as a rod or plate of graphite.

U.S. Pat. No. 4,331,745 issued to Catanzarite discloses an electrochemical cell having at least two parallel electrical paths for externally impressed current to flow through the cell. According to Catanzarite, one or more of the paths include substantially all of the reaction byproducts of the cell and at least one path exists that does not contain significant reaction byproducts. In a preferred embodiment, portions of the two electrodes are disclosed to have contiguous surfaces spaced from each other by a porous separator material with the surfaces chosen to allow plating dendritic growth from one electrode to the other at potential differences below that at which electrolysis occurs.

U.S. Pat. No. 4,452,777 issued to Abraham et al discloses an electrochemical cell having a housing containing a sodium anode assembly, a cathode assembly and an electrolyte. Abraham discloses the electrolyte as a sodium ion conducting alkali metal aluminum tetrahalide. The cathode material is a transition metal chalcogenide, or a reaction product of the chalcogenide and the electrolyte, and is disclosed to be placed on a substrate in contact with the electrolyte.

U.S. Pat. No. 4,556,613 issued to Taylor et al discloses an electrochemical cell with a lithium anode having a metal-glass assembly placed thereon. The metal chambers of the assembly are designed as terminal conductors for the cell. According to Taylor, the glass electrically insulates the metal members from each other and is hermetically sealed to each of the metal members by glass-metal bonds.

U.S. Pat. No. 4,598,029 issued to Doddapaneni et al discloses a safety separator for use in high energy density non-aqueous electrochemical cells which is sufficiently porous to allow normal cell operation in the forward direction but which prevents voltage reversal in other cases. As disclosed by Doddapaneni, the separator may be a thin sheet of ceramic material but does not necessarily have to contact either the anode or the cathode. In operation, the separator forms an ion-permeable mechanical barrier separating the electrodes while allowing normal cell operation.

U.S. Pat. No. 4,613,551 also issued to Doddapaneni discloses an improved catalyst for use in high rate active metal non-aqueous cells.

U.S. Pat. No. 4,824,743 issued to Fujii et al discloses a secondary battery having a stack of secondary cells which comprise a separation membrane. As disclosed by Fujii, the membrane is produced by mixing a high molecular compound matrix material, an ion-exchange material, and a pore forming material. The mixture is then kneaded to extrude or roll the mixture in the form of a membrane. The pore forming material is then extruded.

A dry cell containing aluminum as the anode, manganese dioxide as the cathode with an electrolyte of aluminum chloride-ammonium perchlorate is described in Morehouse, Glicksman and Lozier, PROCEEDINGS OF THE IRE, pages 1462-83 (August, 1958).

U.S. Pat. No. 3,316,126, Lekuc describes a fuel cell utilizing a metal electrode as one electrode and a gaseous reactant such as oxygen is the oxidant with a liquid electrolyte bath therebetween.

The object of the present invention is to have a highly reactive metal on the electromotive force series, such as aluminum, readily available in a convenient form. The aluminum should remain available in a reactive state and would be ready for electrochemical reaction, and thereby generation of electrical energy.

SUMMARY OF THE INVENTION

Described is a device for the electrochemical generation of direct current comprising:

an electrode comprised of aluminum mercury mixture, an electrode comprised of an oxidant, and a separator therebetween.

DESCRIPTION OF PREFERRED EMBODIMENTS

Figure 1:
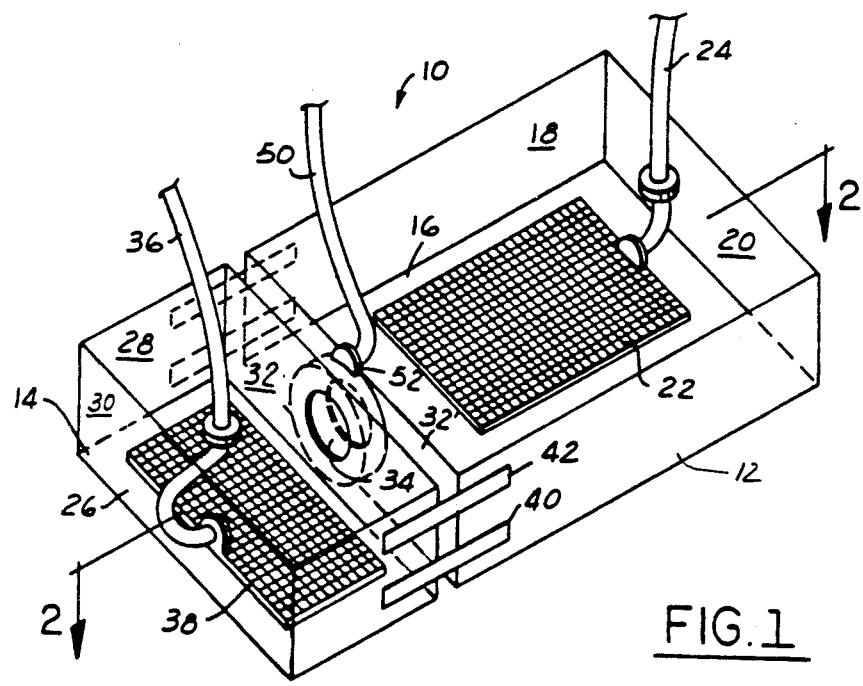
FIG. 1 is a top perspective view of the apparatus useful in the electrochemical energy device of the present invention.
Figure 2:
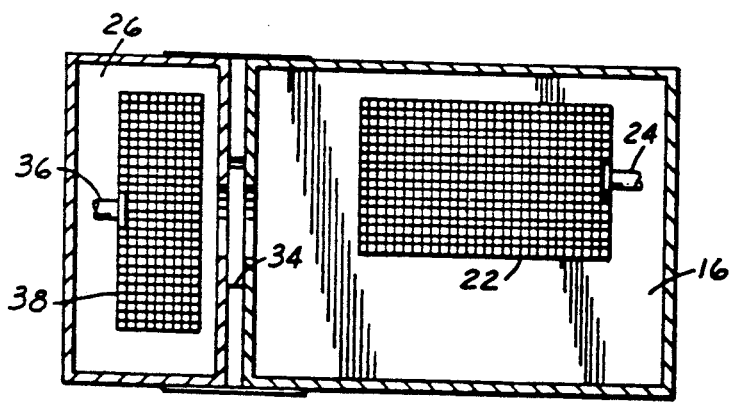
FIG. 2 is a sectional view taken along lines 2—2 of FIG. 1.

In general, the invention of the present application is to have aluminum available for reaction in an electrochemical device by having the aluminum dissolved in mercury. The mercury aluminum amalgam would be the negative electrode. The positive electrode would be a source of an oxidant and between the two electrodes would be a separator which would permit ionic conduction between the positive and negative electrodes.

The mercury aluminum amalgam is considered the metal electrode. It undergoes the reaction of dissolving the aluminum into aluminum ions releasing three electrons to the external circuit. This generally is considered an anode. The oxygen electrode is one where the electrons are consumed. This generally is considered a cathode. It is also considered the positive electrode.

The aluminum is dissolved in mercury in a normal manner. It is most desirable that the aluminum not be oxidized during the dissolution process. This can be performed in an inert atmosphere or any atmosphere as long as the aluminum does not fully oxidize. When the aluminum is present in the mercury amalgam, it would be available for reactivity during the discharge of electrical energy storage device.

It is to be appreciated that the aluminum mercury amalgam would be in a liquid state. To permit as much of the aluminum to react during the discharge process, it may be necessary to circulate, mix, stir or agitate the aluminum mercury amalgam. All that is required is that the aluminum be available to contact the current collector.

During the discharge of the electrochemical storage device, the aluminum is converted to aluminum ions with a generation of three electrons. The aluminum ions are soluble in the mercury liquid. Alternatively, an additional material in which both the aluminum and the aluminum ions in the mercury are soluble could be utilized Alternatively, an additional liquid or vapor could be utilized that would facilitate the removal of the aluminum ions from the mercury after the electrochemical reaction so that the aluminum would preferentially dissolve in the additional liquid or vapor as opposed to the liquid mercury.

It is to be appreciated that the source of the oxidant can be a variety of materials. It should further be appreciated that the oxidant need not be inserted into the electrical energy storage device until the discharge of the device commences and thereby the electrochemical generation of direct current is desired.

The source of the oxidant can be air, oxygen or certain chemical materials such as alkaline metal or alkaline earth metal oxides and peroxides. The most preferred are the peroxides such as potassium permanganate, potassium dichromate, potassium perchlorate, permanganic acid and the like.

In general, the "per" compounds can be retained in the electrode compartment as solubilized in a desired liquid such as water or other material that is inert in the overall electrical energy storage device. The oxidant can come in contact with the electrode thereby taking on electrons and becomes reduced. This reduction occurs at the cathode and the material that is in the cathode compartment is in the most convenient form for making the oxygen most readily available for contact with the current collector.

It is to be appreciated that in order to permit the oxidant to participate in the reaction, it may require a mixing or stirring in order to ensure full reactivity of the oxide.

Between the positive electrode compartment and the negative electrode compartment would be a separator which serves the function of permitting electron movement therebetween. The separator should be a conductor of electricity. A variety of separators may be utilized, most preferably a germanium wafer that is doped with aluminum. This would be in a thin-sliced form most conveniently permitting the passage of electrons therebetween.

Alternatively, the separator could be a carbonaceous material such as carbon or graphite. The separator should be relatively inert in the electrical energy storage device.

Turning now to the drawings, FIGURE 1 shows the apparatus useful as an electric energy storage device of the present invention 10. On the right side of the device is a compartment 12 which contains the mercury aluminum amalgam. Compartment 14 would contain the oxidant materials. While it is to be appreciated that the graphic representation of FIG. 1 shows that the amalgam compartment is significantly larger than the oxidant compartment 14, varying embodiments may have the same size for the compartments or a larger compartment for the oxidant depending upon the desired rate of extraction of the electrical energy. The drawings depict the apparatus useful in the electric energy storage device without the presence of the reactants themselves. In the case of the mercury aluminum amalgam compartment 12, all that would be required would be the insertion of the mercury aluminum into the compartment and the same with the oxidant compartment. The mercury aluminum compartment 12 is comprised generally of rectangular shape having a bottom 16 and sides 18 and 20. A current collector 22 is utilized and is comprised of a conducting plate or mesh with insulated lead wire 24. It is to be appreciated that the mercury aluminum amalgam that is within the compartment 12 should be hermetically sealed or at least sealed to exclude the oxidizing gases.

In the compartment containing the oxidant, it likewise is rectangular in shape having base 26 and sides 28 and 30. Back plate 32 and 32' has retained therebetween a gallium wafer 34 which is doped with the aluminum. Current collector 36 is attached to grid 38 to permit the flow of electrons. The current collectors 24 and 36 can be connected to an external volt meter which can measure the voltage flow which is a measurement of the electrochemical generation of direct current in the device. The oxidant material that is present in the cathode compartment 26 again should be hermetically sealed.

The compartments 12 and 14 are retained in place by attachment means 40 and 42 as any convenient technique for holding the devices together. Obviously the device can be manufactured all in one piece as a unitary device without separate attachments It is preferred that the material that makes up the device be as lightweight as possible generally using a plastic such as polyethylene or polypropylene and the like. Also, polyvinylchloride could be used.

The electromotive force in volts for the aluminum mercury amalgam is 1.66 volts. The oxidant electrode, e.g., potassium permanganate would have EMF voltage of 1.68. The open cell voltage would be approximately 3.34.

In order to stimulate the discharge of the electric energy storage device, it may be desired to have a source of direct or alternating current added to the device by passing a current through current connector 50. This current connector is directly attached at the point 52 which is where the germanium aluminum doped wafer is present in the device. This D.C. or A.C. current can then become a function of this cell, e.g., a variable self-excitation current. This cell may be capable of being recharged repeatably, utilizing a higher D.C. voltage source. It is expected that with the variable "excitation" current function, a variable charge rate (time) is probable.

It is to be understood that the following claims are intended to cover all of the generic and specific features of the invention herein described and all statements of the scope of the invention which is a matter of language, might be said to fall therebetween.

What is claimed is:

1. A device for the electrochemical generation of direct current comprising:
   an electrode comprised of aluminum mercury amalgam mixture;
   an electrode comprised of an oxidant which is a source of oxygen; and
   an electronic conductor separator therebetween wherein the separator is a wafer comprised of germanium.

2. The device of claim 1 wherein the source of oxygen is an alkaline metal or alkaline earth metal peroxide.

3. The device of claim 2 wherein the peroxide is a permanganate.

4. The device of claim 3 wherein the permanganate is dissolved in an aqueous medium.

5. The device of claim 1 wherein the germanium is comprised of a germanium aluminum doped wafer.

6. A method of generating electrical energy comprising the steps of:
   providing an electrode containing mercury aluminum mixture;
   providing an electrode comprised of an oxidant and a separator of a wafer comprised of germanium therebetween;
   reacting the oxidant at the cathode electrode and reacting the aluminum at the anode electrode thereby causing direct current to flow.

7. The process of claim 5 wherein the source of oxygen is an alkaline metal or alkaline earth metal peroxide.

8. The process of claim 5 wherein the peroxide is a permanganate.

9. The process of claim 8 wherein the permanganate is dissolved in an aqueous medium.

10. The process of claim 8 wherein the germanium is comprised of a germanium aluminum doped wafer.

* * * * *